US007965843B1

(12) United States Patent
Maino et al.

(10) Patent No.: US 7,965,843 B1
(45) Date of Patent: Jun. 21, 2011

(54) METHODS AND APPARATUS FOR SECURITY OVER FIBRE CHANNEL

(75) Inventors: Fabio R. Maino, Palo Alto, CA (US); Marco Di Benedetto, Santa Clara, CA (US); Claudio Desanti, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1543 days.

(21) Appl. No.: 10/034,367

(22) Filed: Dec. 27, 2001

(51) Int. Cl.
*H04L 9/12* (2006.01)
(52) U.S. Cl. ............. 380/256; 713/160; 713/168; 726/3
(58) Field of Classification Search .................. 380/256; 713/160, 168; 726/3
See application file for complete search history.

(56) References Cited

U.S. PATENT DOCUMENTS

| | | | | | |
|---|---|---|---|---|---|
| 4,217,488 | A | * | 8/1980 | Hubbard | 398/40 |
| 4,451,916 | A | * | 5/1984 | Casper et al. | 714/4 |
| 4,516,272 | A | * | 5/1985 | Yano | 398/58 |
| 5,070,528 | A | * | 12/1991 | Hawe et al. | 713/161 |
| 5,319,712 | A | * | 6/1994 | Finkelstein et al. | 380/44 |
| 5,764,890 | A | * | 6/1998 | Glasser et al. | 726/11 |
| 5,946,467 | A | * | 8/1999 | Pathakis et al. | 709/236 |
| 5,959,990 | A | * | 9/1999 | Frantz et al. | 370/392 |
| 6,061,794 | A | * | 5/2000 | Angelo et al. | 726/3 |
| 6,070,243 | A | * | 5/2000 | See et al. | 726/2 |
| 6,081,900 | A | * | 6/2000 | Subramaniam et al. | 726/19 |
| 6,108,583 | A | * | 8/2000 | Schneck et al. | 700/9 |
| 6,263,445 | B1 | * | 7/2001 | Blumenau | 726/2 |
| 6,347,334 | B1 | * | 2/2002 | Fredericks et al. | 709/220 |
| 6,401,128 | B1 | * | 6/2002 | Stai et al. | 709/236 |
| 6,823,453 | B1 | * | 11/2004 | Hagerman | 713/162 |
| 6,865,426 | B1 | * | 3/2005 | Schneck et al. | 700/9 |
| 6,922,785 | B1 | * | 7/2005 | Brewer et al. | 380/28 |
| 6,973,568 | B2 | * | 12/2005 | Hagerman | 713/153 |
| 7,215,667 | B1 | | 5/2007 | Davis | |
| 7,333,612 | B2 | | 2/2008 | Maino et al. | |
| 2002/0129246 | A1 | * | 9/2002 | Blumenau et al. | 713/168 |
| 2002/0184068 | A1 | * | 12/2002 | Krishnan et al. | 705/8 |
| 2003/0028804 | A1 | | 2/2003 | Noehring et al. | |

(Continued)

FOREIGN PATENT DOCUMENTS

WO WO 2005/092001 10/2005

OTHER PUBLICATIONS

T. Wu, "The SRP Authentication and Key Exchange System", RFC 2945 Sep. 2000, pp. 1-7.

(Continued)

*Primary Examiner* — Emmanuel L Moise
*Assistant Examiner* — Tamara Teslovich
(74) *Attorney, Agent, or Firm* — Weaver Austin Villeneuve and Sampson LLP

(57) ABSTRACT

Methods and apparatus are provided for improving both node-based and message-based security in a fibre channel network. Entity to entity authentication and key exchange services can be included in existing initialization messages used for introducing fibre channel network entities into a fibre channel fabric, or with specific messages exchanged over an already initialized communication channel. Both per-message authentication and encryption mechanisms can be activated using the authentication and key exchange services. Messages passed between fibre channel network entities can be encrypted and authenticated using information provided during the authentication sequence. Security services such as per-message authentication, confidentiality, integrity protection, and anti-replay protection can be implemented.

23 Claims, 10 Drawing Sheets

U.S. PATENT DOCUMENTS

| | | | |
|---|---|---|---|
| 2003/0120915 A1* | 6/2003 | Kleinsteiber et al. | 713/153 |
| 2003/0131228 A1 | 7/2003 | Twomey | |
| 2004/0120528 A1 | 6/2004 | Elliott et al. | |
| 2004/0158706 A1 | 8/2004 | Moritomo et al. | |
| 2005/0044354 A1* | 2/2005 | Hagerman | 713/160 |
| 2005/0102514 A1 | 5/2005 | Bergenwall et al. | |
| 2005/0207579 A1 | 9/2005 | Maino et al. | |
| 2006/0274899 A1* | 12/2006 | Zhu et al. | 380/281 |
| 2008/0095367 A1 | 4/2008 | Maino et al. | |

OTHER PUBLICATIONS

Bruce Schneier, *Applied Cryptography—Protocols, Algorithms, and Source Code in C*, Chapter 3, "*Basic Protocols*", pp. 47-74.

Maino, et al., "Methods and Apparatus for Confidentiality Protection for Fibre Channel Common Transport", U.S. Appl. No. 10/805,111, filed Mar. 19, 2004.

Maino, et al., "Methods and Apparatus for Confidentiality Protection for Fibre Channel Common Transport", U.S. Appl. No. 11/959,380, filed Dec. 18, 2007.

International Search Report and Written Opinion for corresponding PCT Patent Application No. PCT/US05/09096 dated Mar. 29, 2007.

Fibre Channel Generic Services—3, (FC-GS-3) Rev. 7.01, Working Draft, Standard, Nov. 28, 2000.

NCITS, "Fibre Channel Generic Services—", Rev. 701, Nov. 2000.

Office Action Dated Jan. 18, 2007 from U.S. Appl. No. 10/805,111.

Office Action Dated May 29, 2007 from U.S. Appl. No. 10/805,111.

Notice of Allowance Dated Oct. 3, 2007 from U.S. Appl. No. 10/805,111.

Allowed Claims from U.S. Appl. No. 10/805,111.

Office Action dated Sep. 13, 2010, Application No. 11/959,380.

Australian Exam Report dated Feb. 19, 2009 issued in Application No. 2005226659.

First Chinese Office Action dated Nov. 14, 2008 issued in Application No. 200580007367.5.

Second Chinese Office Action dated May 8, 2009 issued in Application No. 200580007367.5.

* cited by examiner

Figure 5

| Identifier/Username 501 | Password 503 (Optional) | Salt 505 | Verifier 507 |
|---|---|---|---|
| Node511 | Epiph158 | 26jdk | 2h3jksok |
| ... | ... | ... | ... |
| ... | ... | ... | ... |
| ... | ... | ... | ... |

Figure 7

| Source Address 711 | Destination Address 713 | Class Of Traffic 715 | SPI 701 | Key Information 705 | Algorithm Information 707 |
|---|---|---|---|---|---|
| SID13 | DID135 | Class36 | 2378349 | 323jhkd98, 2j39210 | 3DES, MD5 |
| ... | ... | ... | ... | ... | ... |
| ... | ... | ... | ... | ... | ... |
| ... | ... | ... | ... | ... | ... |

METHODS AND APPARATUS FOR SECURITY OVER FIBRE CHANNEL

BACKGROUND OF THE INVENTION

1. Field of the Invention

The present invention relates to fibre channel security. More specifically, the present invention relates to methods and apparatus for providing security for both fibre channel network entities and fibre channel messages. Security includes services such as authentication, confidentiality, integrity protection, and anti-replay protection.

2. Description of Related Art

Very limited security exists in fibre channel networks. One form of security for fibre channel networks is physical security. All fibre channel network entities, such as switches, disks, tape libraries, disk arrays, and servers can be located in a secure and trusted environment. Access can be limited and strict controls can be maintained over the fibre channel fabric. However, it is not always feasible to locate every fibre channel network entity in a secured environment.

Some security schemes have focused more on secure links. When a new fibre channel network entity is introduced into a fibre channel fabric, directly neighboring nodes check the newly introduced entity to determine whether or not the newly introduced node is authorized to connect to the fabric. However, the checks are made only once by some directly neighboring nodes. Other more distant nodes are unable to perform any checking. Furthermore, once the link is established, no further security is provided. The fabric is deemed trusted even though the fibre channel fabric is still vulnerable to certain attacks such as spoofing, hijacking, or impersonation.

It is therefore desirable to provide methods and apparatus for improving security in a fibre channel network and in particular for improving authentication, confidentiality, message integrity protection, and anti-replay protection in a fibre channel fabric with respect to some or all of the limitations noted above.

SUMMARY OF THE INVENTION

Methods and apparatus are provided for improving both node-based and message-based security in a fibre channel network. Entity to entity authentication and key exchange services can be included in existing initialization messages used for introducing fibre channel network entities into a fibre channel fabric, or in specific messages exchanged over an already initialized communication channel. Both per-message authentication and encryption mechanisms can be activated using the authentication and key exchange services. Messages passed between fibre channel network entities can be encrypted and authenticated using information provided during the authentication sequence. Security services such as per-message authentication, confidentiality, integrity protection, and anti-replay protection can be implemented.

According to various embodiments, a method for authenticating network entities in a fibre channel network is provided. A fibre channel authentication message is received from a first network entity at a second network entity in a fibre channel network. The authentication message provides information for authenticating or re-authenticating the first network entity in the fibre channel network. It is determined that both the first network entity and the second network entity support security. It is verified that the first network entity corresponds to an entry in an authentication table associated with the second network entity. First network entity verification information that confirms the identify of the first network entity is received.

According to other embodiments, a method for processing frames in a fibre channel network having a first network entity and a second network entity is provided. A frame is received at a first network entity from the second network entity in a fibre channel network. A security control indicator in the frame from the second network entity is identified. A security association identifier associated with the frame corresponds to an entry in a security database is determined. A portion of the frame is decrypted by using algorithm information contained in the entry in the security database.

In still other embodiments, a method for transmitting encrypted frames in a fibre channel network having a first network entity and a second network entity is provided. A fibre channel frame having a source corresponding to the first network entity and a destination corresponding to the second network entity is identified. It is determined if the fibre channel frame corresponds to the selectors of an entry in a security database. A portion of the fibre channel frame is encrypted using key and algorithm information associated with the entry in the security database. The fibre channel frame is transmitted to the second network entity.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

FIG. 5 is a diagrammatic representation of one example of an authentication table.

FIG. 7 is a diagrammatic representation of a security database.

DETAILED DESCRIPTION OF SPECIFIC EMBODIMENTS

Methods and Apparatus for Security Over Fibre Channel

Fabio Maino, Marco Di Benedetto, Claudio Desanti

The present invention relates to security in a fibre channel fabric. More specifically, the present invention relates to methods and apparatus for providing both node-based and message-based security.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel used in a storage area network. However, it should be noted that the techniques of the present invention can be applied to a variety of different protocols and networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Methods and apparatus of the present invention provide for security in fibre channel networks. The techniques of the present invention cover both node-based as well as message-based security. For node-based security, mechanisms are provided to authenticate newly initialized or reinitialized network entities in a fibre channel network. The techniques of the present invention can also be used to authenticate already initialized network entities, or to re-authenticate already authenticated and initialized entities. For message-based security, mechanisms are provided for both encryption and authentication of frames passed between fibre channel network entities.

Figure 1:
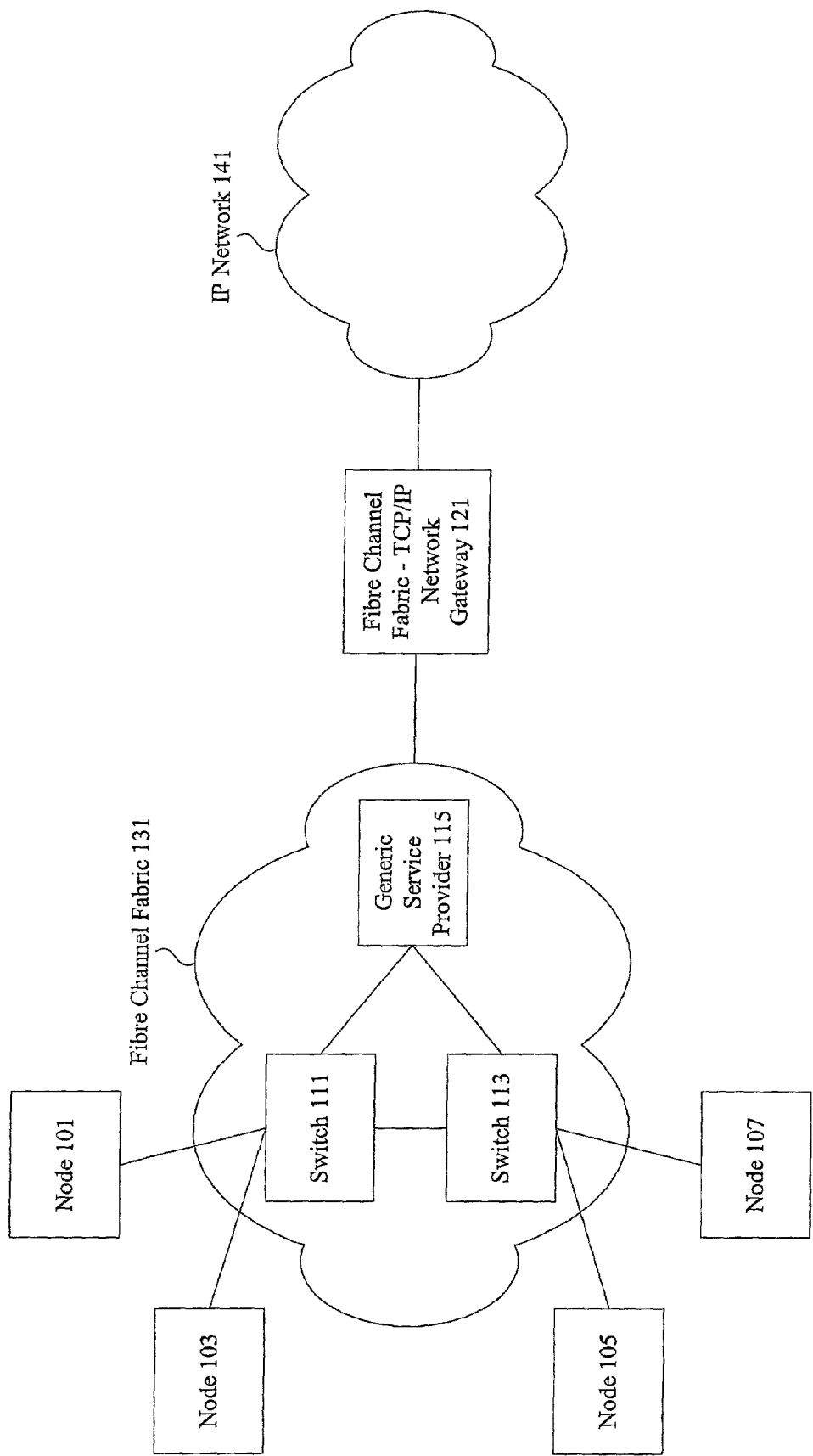
FIG. 1 is a diagrammatic representation of a network that can use the techniques of the present invention.

FIG. 1 is a diagrammatic representation of a network that can use the techniques of the present invention. A fibre channel fabric 131 can include a number of network entities such as switches 111 and 113 as well as a generic service provider 115, which may be yet another switch. The switches can be used to interconnect nodes 101, 103, 105, and 107. Nodes 101, 103, 105, and 107 can be entities such as servers, tape libraries, disk arrays, and/or just a bunch of disks (MOD). The fibre channel architecture shown in FIG. 1 is a switch-based architecture. However, it should be noted that fibre channel networks can be implemented using a variety of different topologies such as arbitrated loop and point-to-point.

The fibre channel network 131 can be connected to a conventional IP network 141 through a device such as a fibre channel to IP gateway 121. Various authentication and encryption schemes exist in conventional TCP/IP networks. However, security in fibre channel networks has been limited primarily because physical security could be typically provided for fibre channel networks. In conventional fibre channel networks, all of the different network entities such as the arrays of disks, tape libraries, servers, switches, and generic service providers, etc., could be located in a controlled and trusted environment such as a secure office space or server room. However, techniques of the present invention recognize that physical security cannot always be provided.

Conventional fibre channel security mechanisms are limited in both capabilities and scope. One fibre channel authentication mechanism provides limited link based security. When a new network entity is introduced into the fibre channel network, immediate neighbors authenticate the new network entity and secure the link. After the link is secured, the network is considered trusted and no other security mechanisms are necessary. However, link based security does not prevent certain types of attacks. In one example, a network intruder can operate a switch impersonating an already authenticated switch. Another attack is the "man in the middle attack." Without per-message security, an attacker between two FC entities can simply forward the authentication messages exchanged by the two entities, and can impersonate each entity by generating or modifying the traffic directed toward the attacked entity. When per-message authentication is in place, the messages generated by the "man in the middle" will be detected as non authenticated (or hijacked) by the receiver.

Furthermore, indirect neighboring network entities have no mechanism for authenticating a newly introduced network node. Existing security mechanisms for fibre channel networks also do not provide a way to authenticate non-adjacent entities. Another fibre channel security mechanism provides for authentication of certain types of messages such as directory fabric management, time, alias, and key distribution messages. These messages are a limited set of service messages. Authentication of certain types of messages has not been broadened to data messages or messages in general nor has encryption been applied to any messages because of the overhead and inefficiency associated with conventional security mechanisms in fibre channel. Consequently, methods and apparatus are provided for the implementation of efficient node-based as well as efficient message-based authentication and encryption schemes.

Figure 2:
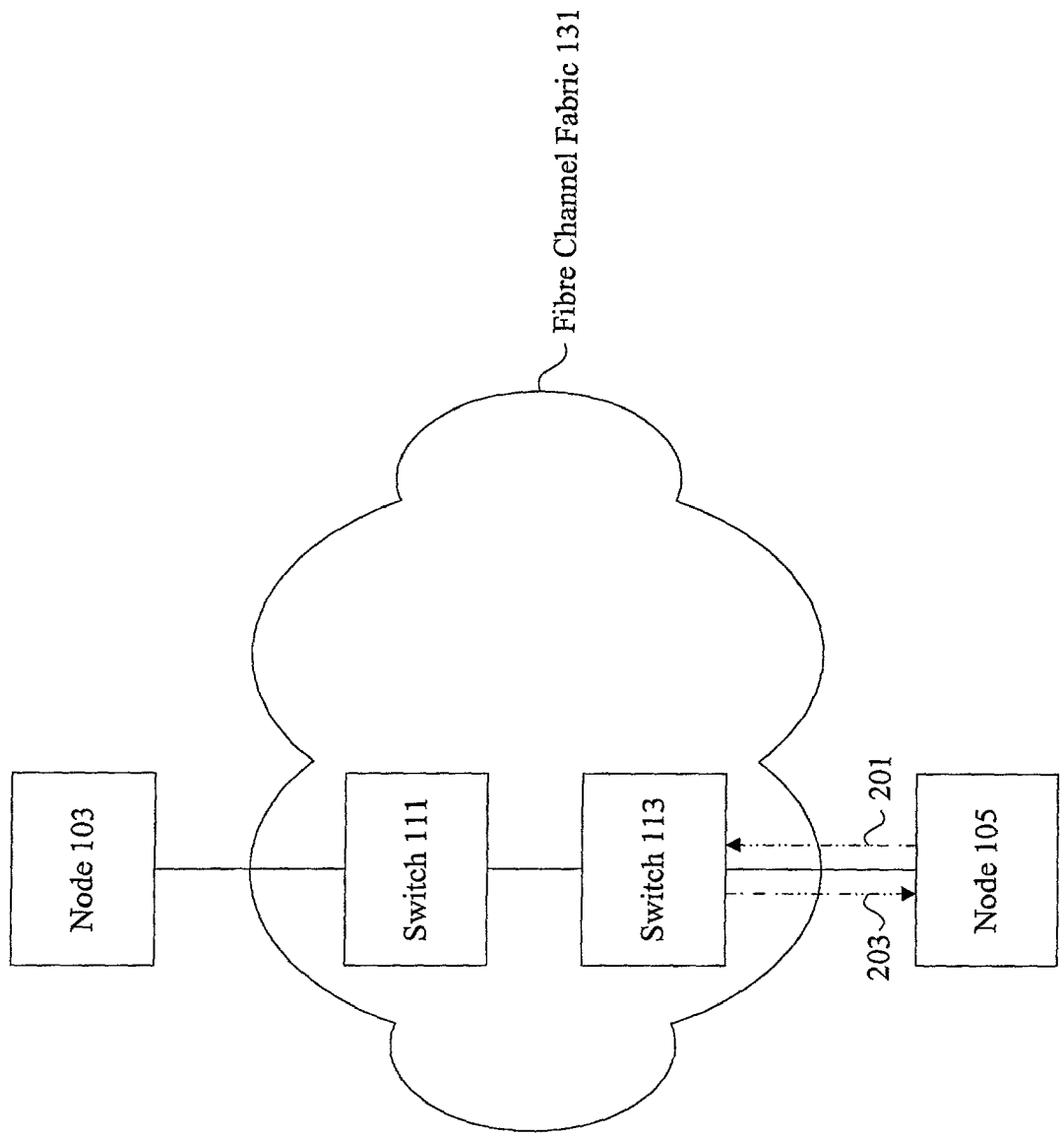
FIG. 2 is a process flow diagram of a node-to-switch authentication sequence.

FIG. 2 is a diagrammatic representation of an initialization sequence in a fibre channel network. While the techniques of the present invention will be described in the context of an initialization sequence, it should be noted that the techniques can also be applied after network entities have been initialized or even authenticated. In one example, authentication is provided immediately after an initialization sequence. When a network entity 105 such as a redundant array of independent disks (RAID) is introduced into a fibre channel fabric 131, a network node 105 transmits an initialization message 201 to a switch 113. It should be noted that any physical or virtual device in a fibre channel fabric is referred to herein as a network entity. Network entities that are capable of connecting other network entities are referred to herein as switches. Some switches can be used as specialized devices such as generic service providers or domain controllers. Network entities that are not used primarily for a switching or interconnection function are referred to as network nodes. Network nodes are often end points of a fibre channel network and can be devices such as servers, tape libraries, RAID, or JBOD. When a fibre channel network node 105 is to be introduced in a fibre channel network 131 through interconnection with a switch 113, fibre channel network node 105 transmits an initialization message 201 to the switch 113.

According to various embodiments, the initialization message transmitted at 201 can be a fabric login message (FLOGI). The fabric login is typically done to determine if a switch is present. More specifically, a port of the network node can attempt to communicate with a port of the switch in the fibre channel fabric. When a fabric-capable device is connected to a switch port, it attempts to log in (FLOGI) to a well-known address, "FFFFFE". The network node can identify itself with the address "000000", indicating that it needs to acquire a fabric address.

The switch 113 can respond to the initialization message with an acknowledgement 203 that contains a unique address, typically a unique three-byte address. This unique three-byte address is the address that the newly initialized or reinitialized network node can use for communications with the fabric. In addition to acquiring a unique address, the initialization message can also be used for negotiating various communication parameters between the network node and the switch. In one example, the login process may also be used to negotiate some operational parameters such as the maximum frame size.

Addresses are identified and managed, for node 105, by the switch 113. The switch 113 can then acknowledge the fabric login message by transmitting a reply at 203 to node 105. At this point, login is typically complete. In conventional implementations, no security is provided in the initialization messages. The techniques of the present invention provide mechanisms for embedding security in the initialization messages to create an initialization sequence with security. As noted above, the techniques of the present invention provide for authentication between two adjacent entities. However, techniques are also provided for authentication between non-adjacent entities.

Fibre Channel can provide data transfer speeds many times greater than that of conventional TCP/IP networks. Consequently, encryption schemes in fibre channel according to the techniques of the present invention are implemented in an efficient manner to handle higher data transfer rates.

Figure 3:
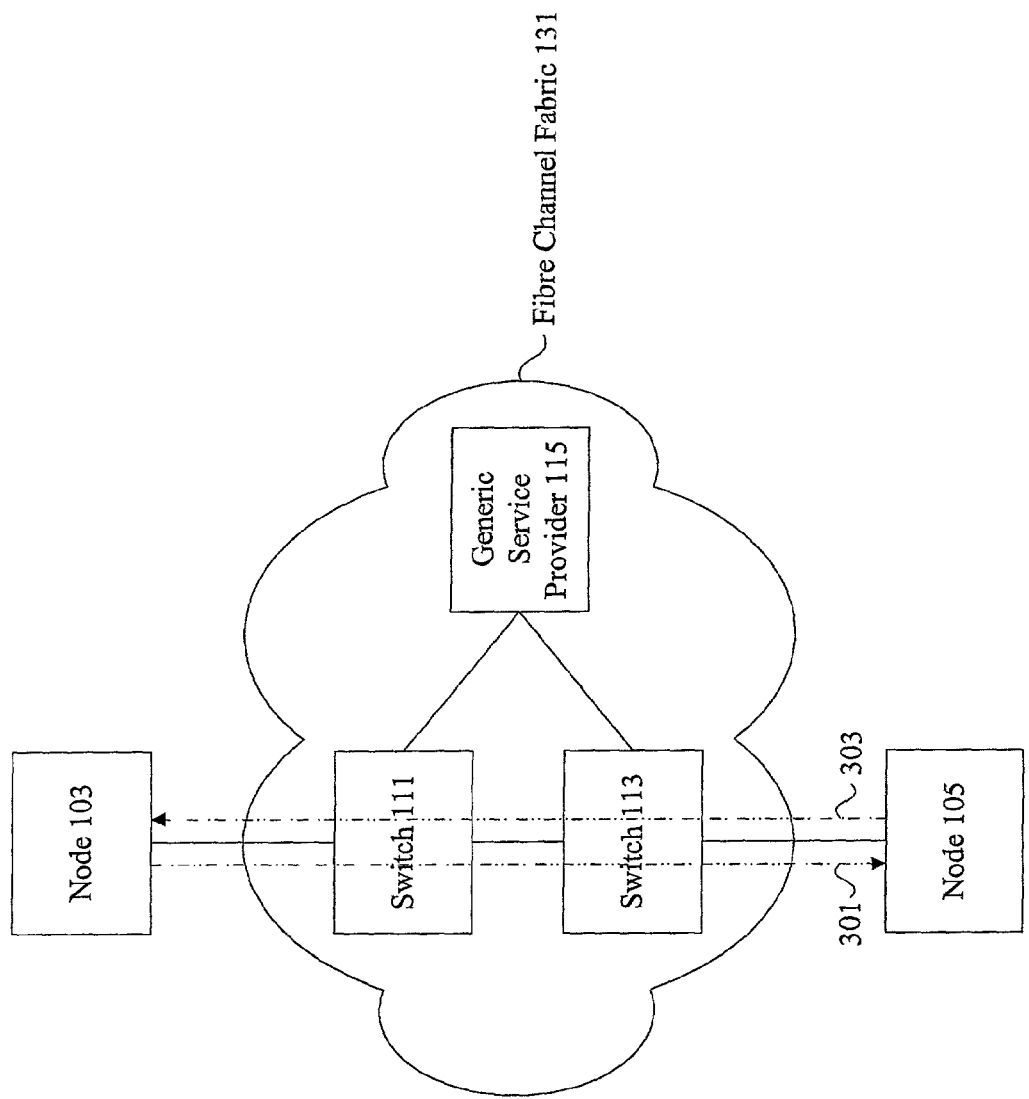
FIG. 3 is a process flow diagram of a switch-to-switch authentication sequence.

FIG. 3 is a diagrammatic representation of an initialization sequence between two non-adjacent network nodes communicating through a fibre channel network. A network node 103 can transmit an initialization message associated with an initialization message through switches 111 and 113 to node 105. That is, a network node 103 can transmit an initialization message 301 to node 105 either directly because it knows the address of node 105, or it can transmit the message indirectly by acquiring the address through a generic service provider 115. In typical implementations, the initialization message transmitted between network nodes is an n_port login (PLOGI) message. Using an n_port login message, two network nodes are able to exchange service parameters across a fibre channel fabric. Service parameters include class of service, max frame size, buffer size, etc. A network node 105 can send an acknowledge or accept message at 303 to network node 103 through the fibre channel fabric 131. At this point, the login is complete. Again, in conventional implementations, no security is provided in the initialization messages between network nodes. In one embodiment, the techniques of the present invention provide authentication and key exchange after the two entities have performed an initialization of the communication channel.

Although only initialization messages between two network nodes and initialization messages between a network node and a switch have been shown, it will be appreciated by one of skill in the art that a wide variety of initialization and login messages can be used to introduce a network entity into a fibre channel fabric. It should be noted that the authentication and key exchange mechanism can be used between a wide variety of FC entities, different messages formats can be used to perform the authentication and key exchange between two FC entities, and the techniques of the present invention can be used in an already initialized and authenticated link to re-authenticate the two entities or to refresh the key information exchanged.

For example, a new switch introduced into a network can transmit an authentication and key exchange message such as a SW_ILS to another switch in the fibre channel fabric. Similarly, authentication and key exchange messages can be used between two domain controllers, a switch and a generic service provider, or two other special-purpose switches. It should be noted that a variety of different authentication and key exchange messages for use between a variety of network entities falls within the scope of the techniques of the present invention. Although the authentication and key exchange messages can be used extensively during the introduction of a network node into a fibre channel fabric, it should be noted that authentication and key exchange messages can also be used during other circumstances, such as a switch reset or re-authentication. All messages used to authenticate or re-authenticate a network entity in a fibre channel networks or to exchange or refresh a key are referred to herein as authentication messages.

Figure 4:
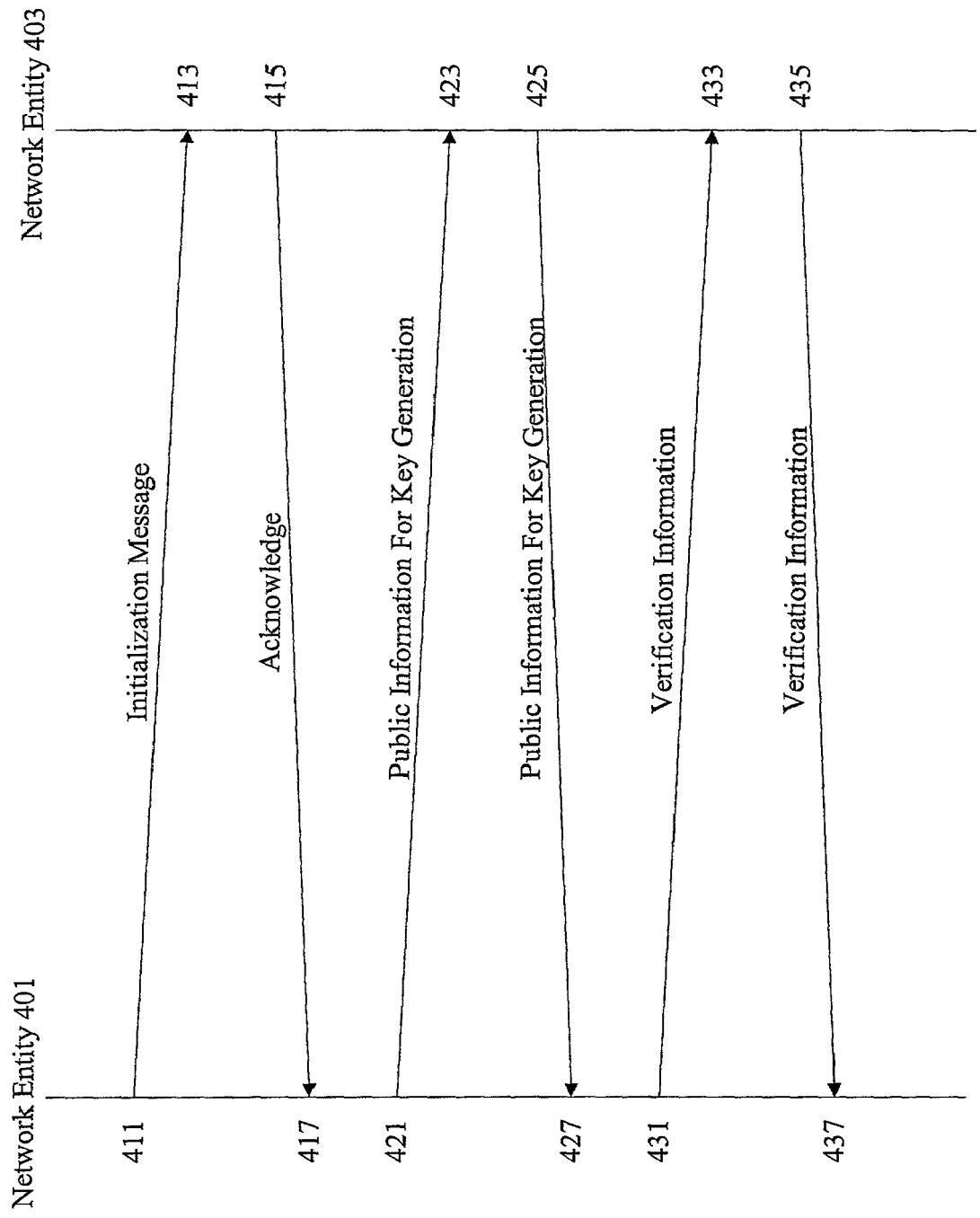
FIG. 4 is an interaction diagram showing an authentication sequence.

FIG. 4 is an interaction diagram showing one example of an authentication sequence. The techniques of the present invention include security in initialization messages such as PLOGI, FLOGI, and other classes of messages such as SW_ILS, FC-CT, ELS and ELP. According to various embodiments, the techniques of the present invention embed a security enable parameter in an authentication message. When a new network entity is introduced into a fibre channel fabric, the new network entity transmits an initialization message with the security enable parameter. The receiving network entity may or may not support security. If the receiving network entity supports authentication, the receiving network entity can extract the security enable parameter and transmit a response acknowledging authentication capabilities. Other information can be exchanged during an authentication sequence to provide for future security in transmissions between the two network entities. In one example, the two entities can exchange cryptographic material in the authentication sequence to allow common key generation.

FIG. 4 shows the process of authentication and key exchange between a network entity 401 and a receiving network entity 403. At 411, the network entity 401 transmits a message such as a PLOGI or FLOGI, or other ad hoc messages with a security enable parameter to a network entity 403. The authentication message can contain an identifier such as a user name or an authentication identifier that allows the receiver to select an authentication mechanism out of a possible set of mechanisms. According to various embodiments, to allow authentication, network entity 403 already has a user name, a salt, and a verifier derived from the salt and the password associated with the user name. If the network entity 403 supports security, the network entity 403 identifies the security enable parameter and transmits an acknowledgement at 415 to network entity 401 indicating support for security. According to various embodiments, the transmission at 415 includes a salt parameter.

A salt parameter is generally used to make passwords more secure. As will be appreciated by one of skill in the art, passwords associated with user names are generally not stored in their plain text form on a server. Passwords on a server are typically operated on with a particular function such as a hash function or an encryption algorithm. Even though the passwords may be stored on a server in their hashed form, for example, a hacker could still determine the hash function used and perform a dictionary attack on the password file by performing a hash on all of the words in an particular dictionary. The hash of all the words in the dictionary can then be compared to a password file to determine whether any passwords correspond to words in the dictionary. A salt value is typically used to make a dictionary attack more difficult. Instead of storing a hashed password in a password file, a password is typically appended to a salt value and a hash is performed on the combined salt and password value to create a combined hash.

The salt value and the combined hash are stored in the password file. By using salt values, a dictionary attack becomes much more difficult as words in a dictionary must be combined with various salt values to implement a dictionary attack. A brute force attempt is made much more difficult as cracking passwords is now much more resource intensive. As noted above, a network entity 401 can transmit a user name to a network entity 403 and a network entity 403 at 415 can transmit the salt associated with the user name back to the network entity 401.

At 417, network entity 401 can compute the combined hash using the salt and the actual password associated with the user name. The network entity 401 can then provide public information such as a generated ephemeral public key A and transmit the public information at 421 to network entity 403. Similarly, network entity 403 at 425 can provide public information such as a generated ephemeral public key B and transmit the public information to network entity 401. At 427, both network entity 401 and network entity 403 can generate a common value such as a common exponential value or a common symmetric key using values available to each of them.

For example, network entity 401 can generate a common exponential value using public information from network entity 403, its own private information used to generate public information provided to network entity 403, and the combined hash calculated by operating on the password appended to a salt. Similarly, network entity 403 can generate the common exponential value using public information from network entity 401, a verifier derived from the hash of the combined salt and password, and private information used to generate public information provided to network entity 401. If the password used to derive the verifier at network entity 403 is the same as the password used to generate the combined hash value at network entity 401, the exponential value will be the same.

More information on deriving common exponential values using salt values and verifiers is provided in "The Secure Remote Password Authentication And Key Exchange System", RFC 2945, the entirety of which is incorporated by reference for all purposes. According to various embodiments, the common value can then be used as a session key for communications between network entity 401 and network entity 403. According to other embodiments, a hash is performed on the common exponential value to derive a cryptographically strong session key.

At 431, network entity 401 can send a hash of the session key combined with other public information to network entity 403. The network entity 403 can then perform a hash of the derived session key combined with the other information known to network entity 403 to verify the identity of the network entity 401. Similarly, at 435, network entity 403 can send a hash of the session key along with other information known to network entity 401 to allow network entity 401 to verify the identity of network entity 403. It should be noted that any information such as public keys that can be discerned by a third party over a network is referred to herein as public information.

It should be noted that in the above implementation, a password is never transmitted over the network. Instead, both network entities use derivatives of the password to generate the session key and other cryptographic information used for secure transmission. Both the password and the session key need not ever be transmitted over the network.

As noted above, when a network entity 401 transmits an authentication message with an identifier and a security enable parameter to a network entity 403, network entity 403 determines in a cryptographically secure way the identity of network entity 401. Network entity 403 can verify whether the identity of a network entity 401 is the one it claims by reference in an authentication table that can contain a user name, a salt, and a verifier which is a derivative of the password combined with salt. The authentication table can be manually or automatically configured.

FIG. 5 is a diagrammatic representation of an authentication table. Column 501 contains identifiers such as user names of network entities that need to be authenticated, according to various embodiments. Column 503 can contain a hash value of the combined salt and password. Column 505 contains salt values for increasing the integrity of a password file. Column 507 contains verifiers which are derivatives of the password and the salt values. According to various embodiments, values in column 503 are not maintained in order to increase security of the authentication table. Instead, only verifiers are maintained.

It should be noted that although the authentication table is shown and described as a table having a set number of columns and rows, it will be appreciated by one of skill in the art that a variety of different data structures, files, databases, and formats can be used to maintain information authenticating the network entities in a fibre channel fabric.

Figure 6:
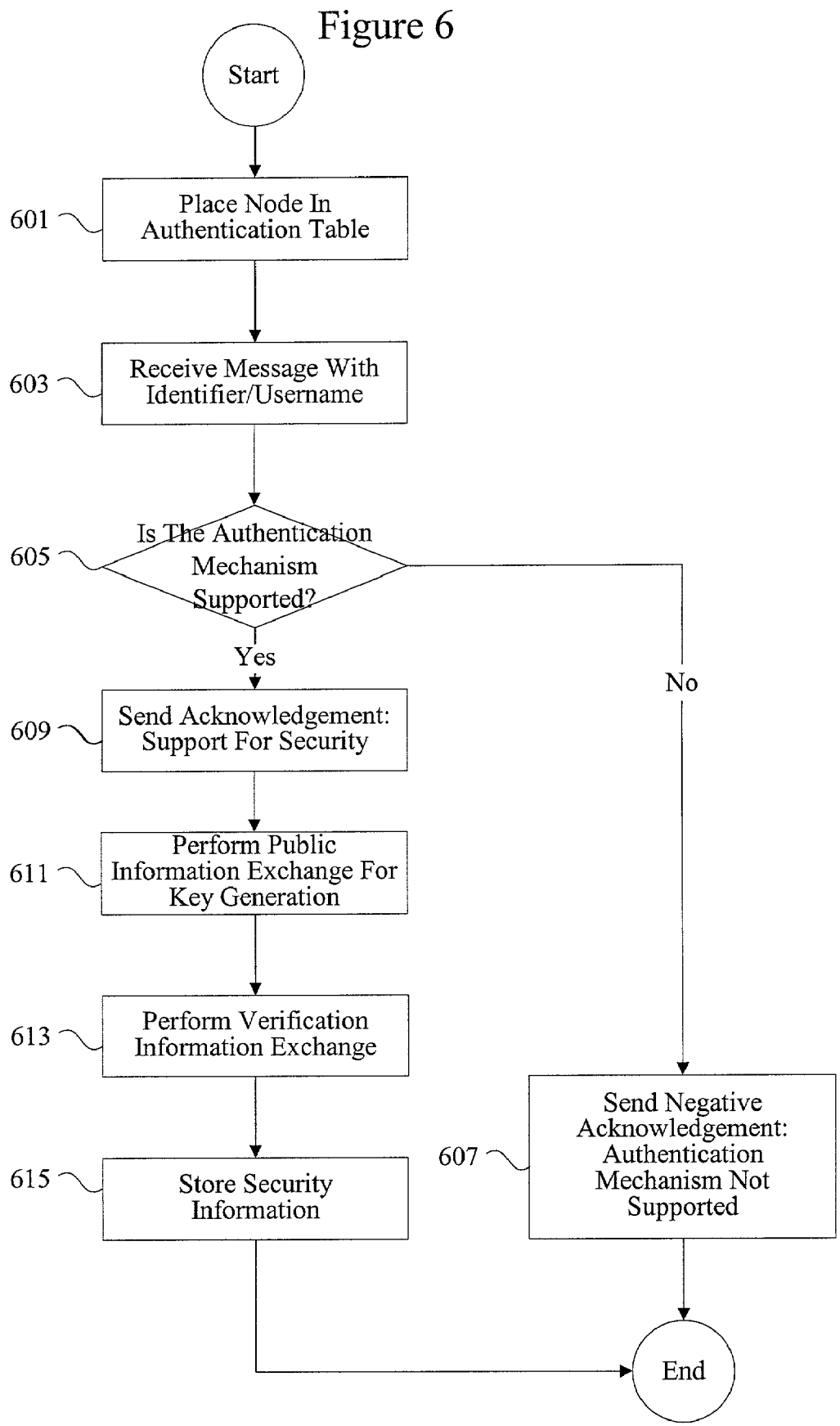
FIG. 6 is a process flow diagram showing node-based authentication.

FIG. 6 is a process flow diagram showing node to node authentication in a fibre channel fabric. At 601, a network node is added to an authentication table such as the table shown in FIG. 5. Adding the network node to an authentication table can entail placing the user name, password, salt, and verifier into a database. The values can be placed into an authentication table either manually or automatically at 601. At 603, a network node receives the message that initiates the authentication session associated with a particular identifier such as a user name. At 605, the receiving node determines whether authentication mechanisms are supported.

An authentication exchange can happen after initialization. If the receiving entity does not support the authentication and key exchange mechanism proposed in the message received at 603, it will send a negative acknowledgement at 607 that the authentication mechanisms is not supported and the authentication sequence is not exchanged. The originating node can then be non-authenticated, and subsequent messages arriving from that node may be discarded, or the received node may perform a logout. If it is determined at 609 that the authentication mechanism is supported, the receiving node will send an acknowledgement that the authentication sequence can start along with a salt value and other information. It should be noted that a salt value does not always necessarily has to be sent.

At 611, a subsequent authentication message is transmitted to the receiving node and the network nodes in the fibre channel fabric can exchange messages with key information to complete the authentication and key exchange sequence. It should be noted that the messages used for authenticating and re-authenticating a network node in a fibre channel network are referred to herein as authentication messages while a sequence of messages completing exchange of security parameters is referred to herein as an authentication sequence. During the authentication sequence, public information for key generation can be exchanged at 611 and information verifying the generation of the correct keys can be exchanged at 613. In one embodiment, the public information exchanged is an ephemeral public key for generating a symmetric session key for communications between two network entities. The verification information can be a hash of the private key combined with other information known to the network entities.

It should be noted that the techniques of the present invention allow security to be fully integrated into an existing fibre channel initialization sequence with effective and efficient implementations of fibre channel mechanisms. The techniques of the present invention can also provide authentication and key exchange services between two fibre channel network entities as soon as a new network entity is introduced into a fibre channel fabric, or whenever requested by an upper layer protocol.

The authentication and key exchange sequence described above provides the two fibre channel entities with a common key that may be leveraged to provide per-message security. Using that common key, each fibre channel message exchanged between two authenticated entities can be cryptographically transformed in a such a way that the receiver can verify several characteristics of the message such as the following: the message originated from the sender, the message has not been tampered with after transmission, and/or the message is not decipherable by one without the common key.

Each class of traffic exchanged between the two authenticated nodes can be provided with different security services. Some security services for control and traffic messages include authentication, protection against tampering, and encryption. The relationship between two fibre channel ports that affords security services to traffic transmitted between the two ports is referred to herein as a security association. Examples of security association parameters are a security parameters index, the destination address, a sequence number, key information, and algorithm information. Outgoing traffic is transformed according to the parameters of the outgoing security association if the traffic matches the selectors of that security association. Examples of security association selectors are source identifiers, destination identifiers, and class of traffic. A security database can be used to determine whether frames should be encrypted and authenticated based on parameters of the frame such as source and destination addresses and class. The security can be continuous and uninterrupted and can apply to any type of data transmitted between the two network entities.

FIG. 7 is a diagrammatic representation of a security database such as a security association database. In one embodiment, the first three columns of the database contain the security association selectors that determine which frames will be encapsulated according to the parameters specified in the security association.

Selectors can be the source address 711, destination address 713, and the class of traffic 715. A security association database can contain an index such as a security parameters index SPI 701 that can be used to identify an entry in a security database. The security database can also contain a class of traffic column (715). The SPI column 701 gives information for determining whether the frame should be decrypted and the authentication verified during receipt of the frame. The security database can also contain key information 705. Key information 705 can include session keys as well as information for encrypting, decrypting, or authenticating a message. A security database can also contain information relating to the algorithm used for encryption or authentication 707. Algorithms commonly used for encryption include 3DES/DES and AES while algorithms commonly used for authentication include MD5 and SHA1.

Figure 8:
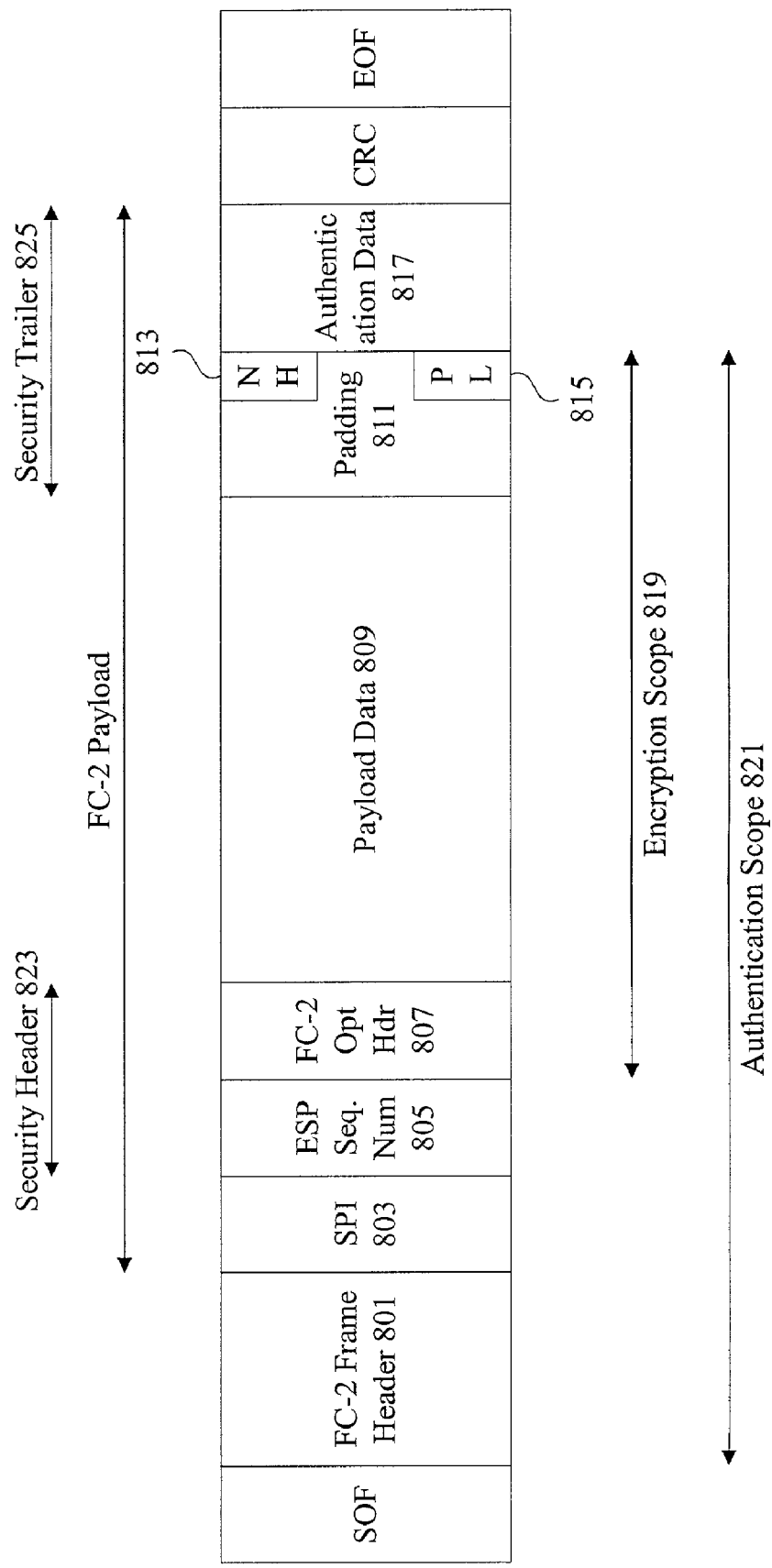
FIG. 8 is a diagrammatic representation of a secure frame transmitted over fibre channel.

FIG. 8 is a diagrammatic representation of a secured frame that can be transmitted between network entities in a fibre channel fabric. The fibre channel frame can include a FC-2 header 801. The header 801 can contain source and destination information for transmitting a packet through a fibre channel network. The header can also include a security control indicator such as a DF_CTL bit showing that the frame should be decrypted and authenticated. The fibre channel frame can also include optional header information 807 as well as payload data 809 variable in length. According to various embodiments, if the fibre channel frame has a particular destination and belongs to a particular class, as indicated in the fibre channel frame header 801, the fibre channel frame is secured by combining the frame with a security header 823 and a security trailer 825 as well as encrypting a portion 819 of the frame and generating authentication data 821.

The headers and trailers in one example can be Encapsulation Security Payload (ESP) headers and ESP trailers. The security header 823 can include a security parameters index 803 for identifying an entry in a security database. The security header 823 can also include a sequence number 805 for prevention of replay attacks. For secured frames, optional header 807, payload data 809, and payload padding 811 can be encrypted with the algorithms and key as indicated in the security database. As will be appreciated by one of skill in the art, padding provides for block alignment in encryption and authentication. Padding 811 can include a padding length 815 to indicate the amount to adjust after decryption. It should be noted, that a source and destination identifier in the header is often not computed between the authentication data to allow for address translation in a fibre channel network. In other typical implementations, a source identifier and a destination identifier are included. This inclusion prevents network address translation. Similarly, the security parameters index 803 and the sequence number 805 are not encrypted in order to allow the receiving node to acquire information to properly decrypt the frame.

The secured frame can also include authentication data 817. According to various embodiments, authentication data 817 is a hash of the frame header 801, SPI 803, sequence number 805, optional header 807, payload data 809, and padding 811, with a common key shared by the two communicating entities. Authentication data 817 allows the receiving node to verify that the frame is indeed from the network node indicated in the frame header. It should be noted that variations to the frame format are contemplated. In one example, a sequence number is not included in an optional header and is instead contained in the frame header. The portion encrypted can also vary. In one example, only payload data is encrypted.

Figure 9:
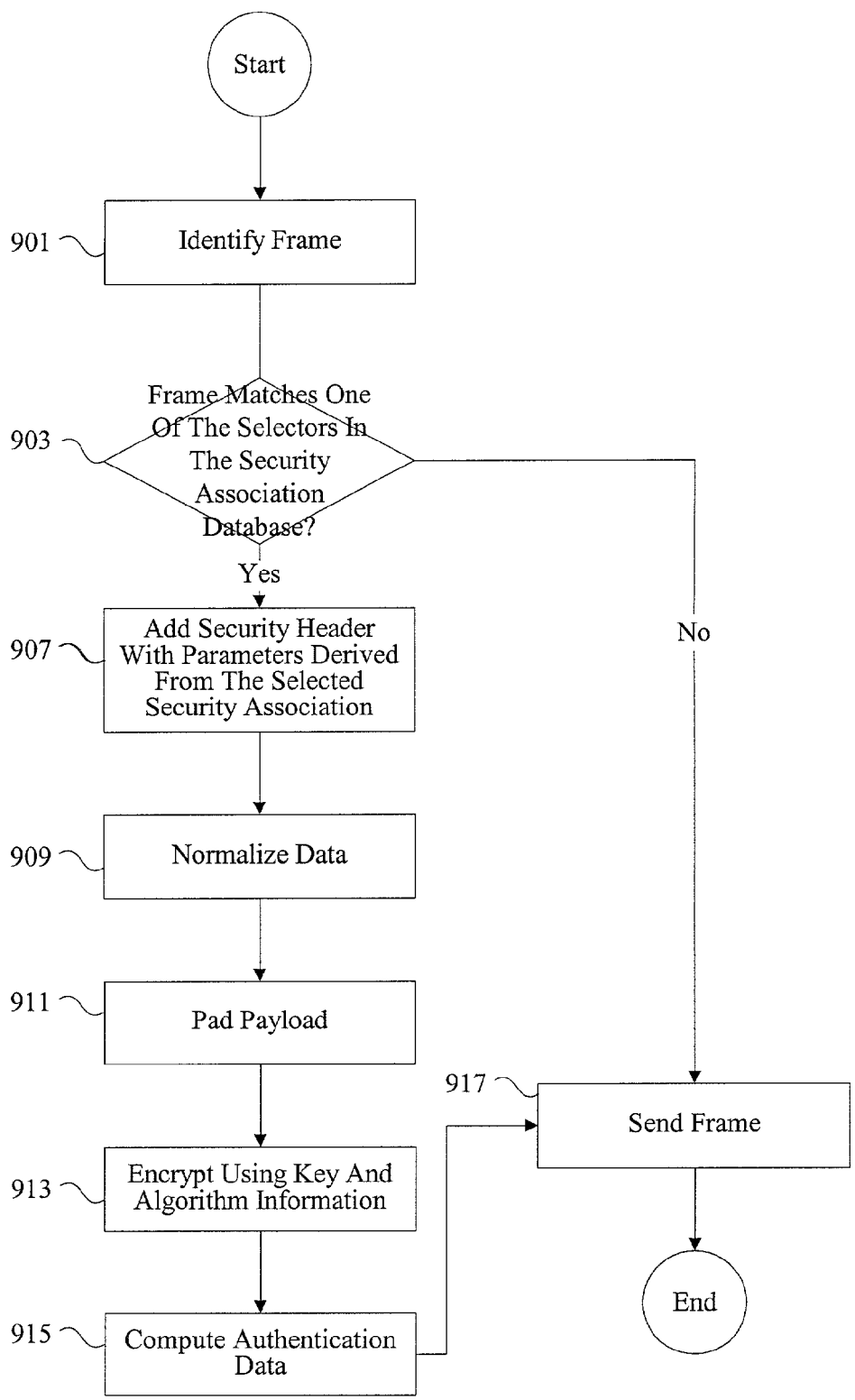
FIG. 9 is a process flow diagram showing the generation of a secure frame.

FIG. 9 is a process flow diagram showing the generation of a secure frame such as the one shown in FIG. 8. At 901, a frame is identified. Identifying a frame may entail locating a frame queued for transmission. At 903, a security database is checked for a frame that matches on of the selectors in the security association database. An entry may correspond to the identified frame if the destination identifier of the frame is contained in an entry in the security database. In another example, destination identifiers, and class of frames can be compared with entries in a security database. If the frame does not correspond with an entry in the security database, the frame is transmitted at 917 without securing the frame. That is, a portion of the frame is not encrypted and a portion of the frame may not be hashed to allow for authentication. If the frame does correspond to an entry in the database, a security header and trailer such as these shown in FIG. 8 with values derived from the selected security association are added to the frame at 907. The security header can include the security parameters index and a sequence number, while the trailer can include authentication data.

To computes authentication data, a source identifier and destination identifier are normalized and security control indicator such as a DF_CTL bit can be set (to allow identification of secured frames). In one example the security control indicator is set by changing a vendor specific value. To allow for encryption and authentication at 911, the payload can be padded. At 913, a portion of the frame is encrypted using key information and algorithm information. The frame may be encrypted using a session key agreed upon during an authentication and key exchange sequence between the node and the destination. The algorithm may also been agreed upon during the authentication and key exchange sequence. Algorithms typically used for encryption include DES/3DES and AES. At 915, authentication data for inclusion in the frame is calculated using key information, algorithm information, and a portion of the frame resulting after modification in 913.

It should be noted that conventional implementations only support authentication for a limited subset of frames termed fibre channel services and not general data frames. The techniques of the present invention support both encryption and authentication for a wide variety of frames and services. The standard FC-GS-3, however, does not provide encryption or privacy protection, and authentication/integrity protection does not cover the fields of the FC-2 frame header.

Figure 10:
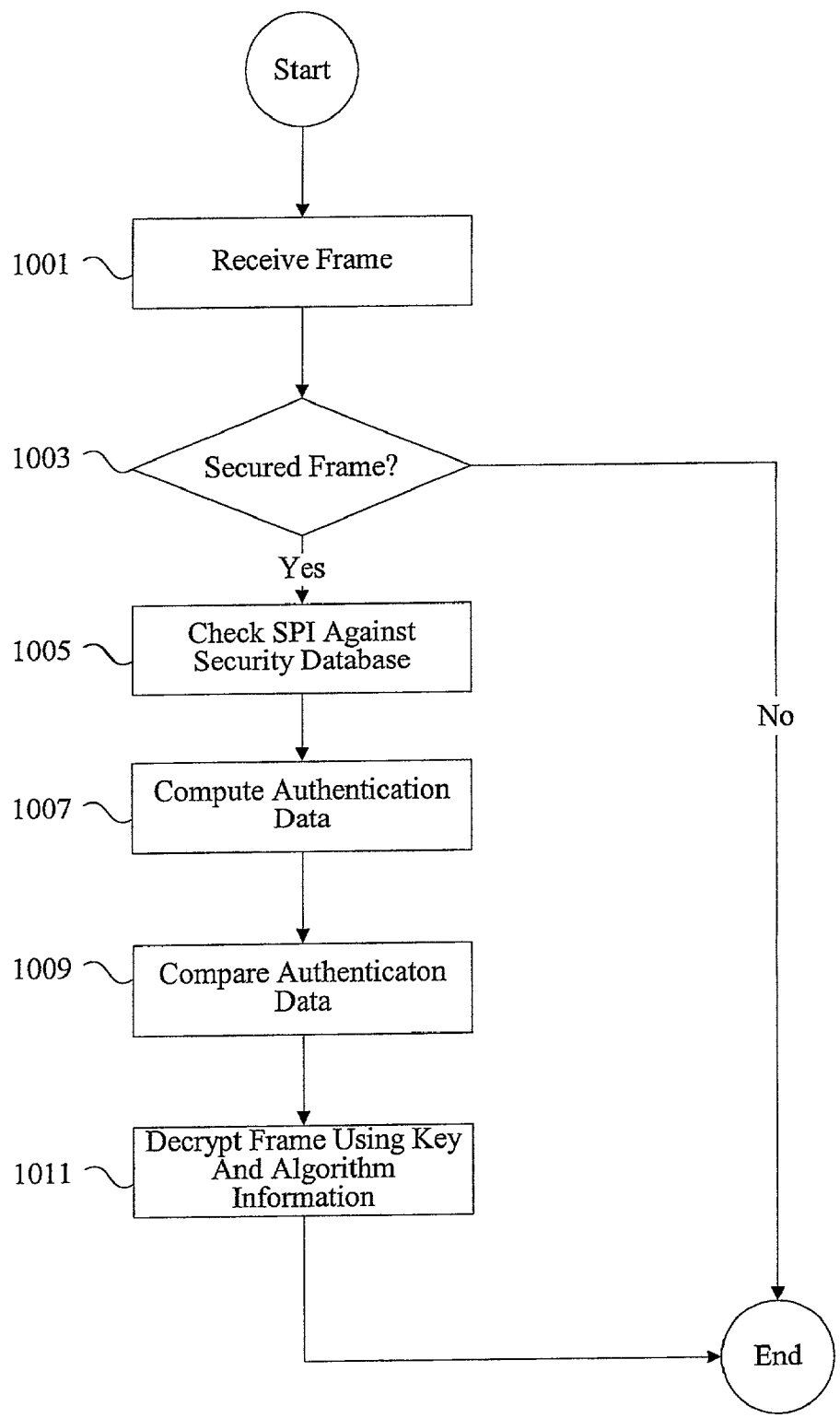
FIG. 10 is a process flow diagram showing the receipt and processing of a secure frame.

FIG. 10 is a process flow diagram showing a network node in a fibre channel fabric receiving a frame. At 1001, the frame is received. At 1003, it is determined if the frame is secured. Any indicator showing that the frame is secure is referred to herein as a security control indicator. It should also be noted that this is distinct from the above mentioned security enable indicator, which is used during an initialization sequence to show whether a newly introduced node supports security. A frame that supports encryption and authentication is herein referred to as a secured frame. A frame that supports only authentication is herein referred to as an authentication secured frame. A frame that supports only encryption is herein referred to as an encryption secured frame.

If the frame is not secured, processing proceeds using a conventional fibre channel protocol. If the frame is secured, an identifier such as a security parameters identifier SPI is referenced against a security database such as a security association database at 1005. Key information and algorithm information are extracted from the entry containing the identifier or security parameters index associated with the received frame. The source identifiers and the destination identifiers are normalized and authentication data is computed at 1007 using key information, algorithm information, and encrypted data as noted in the security database. The authentication data computed is then compared with the authentication data contained in the frame.

If the authentication data matches, the identity of the sender is verified. Otherwise the frame is not authenticated and discarded. At 1011, the encrypted portion of the frame can then be decrypted using key information and algorithm information contained in the security database entry.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of architectures. In one example, although the techniques of the present invention have been described with reference to a transport mode of communication, security can also be implemented in tunnel mode as well. Using tunnel mode, some security can be provided in a fibre channel fabric for communications between two nodes that do not support security. It is therefore intended that the invention be interpreted to include all variations and equivalents that fall within the true spirit and scope of the present invention.

What is claimed is:

1. A method for processing frames in a fibre channel network having a first network entity and a second network entity, the method comprising:
    receiving a first frame at the first network entity from the second network entity in the fibre channel network, wherein the first frame is associated with a fabric login (FLOGI) or port login (PLOGI) message;
    identifying a security enable parameter in the first frame, wherein the security enable parameter is used by the second network entity, when the second network entity is added to the fibre channel network, to determine if the first network entity has authentication capability or supports other security functions;
    transmitting an acknowledgment to the second network entity that the first network entity has authentication capability or supports other security functions, the acknowledgment including algorithm information and a salt parameter;
    receiving a second frame at the first network entity from the second network entity;
    identifying a security control indicator in the second frame from the second network entity, wherein the security control indicator is used to determine if the second frame is encrypted or authenticated;
    determining at the first network entity that a security association identifier associated with the second frame corresponds to an entry in a security database;
    decrypting a first portion of the second frame by using algorithm information contained in the entry in the security database.

2. The method of claim 1, wherein the entry in the security database was created after a fibre channel network authentication sequence between the first and second network entities.

3. The method of claim 2, wherein the first portion is decrypted using a key contained in the entry in the security database.

4. The method of claim 2, wherein the first portion is encrypted using DES, 3DES or AES.

5. The method of claim 2, further comprising:
    recognizing that a second portion of the second frame supports authentication;
        using algorithm information contained in the entry in the security database to authenticate the second portion of the second frame.

6. The method of claim 5, wherein the second portion is authenticated using MD5 or SHA1.

7. The method of claim 5, wherein the authentication sequence is a fibre channel login sequence between the first and second network entities.

8. The method of claim 7, wherein the login sequence is a PLOGI or FLOGI sequence.

9. The method of claim 7, wherein the first and second network entities are domain controllers and the authentication sequence is a FC-CT sequence.

10. The method of claim 7, wherein the first and second network entities are domain controllers and the authentication sequence is a SW_ILS sequence.

11. A method for transmitting encrypted frames in a fibre channel network having a first network entity and a second network entity, the method comprising:
    transmitting a first fibre channel frame having a source corresponding to the first network entity and a destination corresponding to the second network entity, the first fibre channel frame including a security enable parameter, wherein the first fibre channel frame is associated with a fabric login (FLOGI) or a port login (PLOGI) message, wherein the security enable parameter is used by the first network entity, when the first network entity is added to the fibre channel network, to determine if the second network entity has authentication capability or supports other security functions;

receiving an acknowledgment from the second network entity indicating that the second network entity has authentication capability or supports other security functions, the acknowledgement including key and algorithm information and a salt parameter;

inserting key and algorithm information from the second network entity into a security database;

identifying a second fibre channel frame having a source corresponding to the first network entity and a destination corresponding to the second network entity;

determining if the second fibre channel frame corresponds to the selectors of an entry in a security database;

encrypting a first portion of the second fibre channel frame using key and algorithm information associated with the entry in the security database;

providing a security control indicator in the second fibre channel frame, wherein the security control indicator is used to determine if the frame is encrypted or authenticated;

transmitting the second fibre channel frame to the second network entity.

12. The method of claim 11, wherein the entry in the security database was created after a fibre channel network authentication sequence between the first and second network entities.

13. The method of claim 11, wherein the payload is encapsulated using the Authentication Header protocol or the Encapsulating Security Payload protocol.

14. The method of claim 13, further comprising adding security information to the header of the second fibre channel frame.

15. The method of claim 12, wherein a first portion of the second fibre channel frame is encrypted using DES, 3DES, or AES.

16. The method of claim 12, wherein parameters in the header are normalized prior to encrypting the first portion of the second fibre channel frame.

17. The method of claim 16, wherein the payload is padded prior to encrypting the first portion of the second fibre channel frame.

18. The method of claim 12, further comprising:

computing authentication data using key and algorithm information as well as a second portion of the second fibre channel frame.

19. The method of claim 18, wherein authentication data is computed using MD5 or SHA1.

20. The method of claim 18, wherein the authentication sequence is a fibre channel login sequence between the first and second network entities.

21. The method of claim 20, wherein the login sequence is a PLOGI or FLOGI sequence.

22. The method of claim 20, wherein the first and second network entities are domain controllers and the authentication sequence is a FC-CT sequence or an SW_ILS message.

23. An apparatus for transmitting encrypted frames in a fibre channel network having a first network entity and a second network entity, the apparatus comprising:

means for transmitting a first fibre channel frame having a source corresponding to the first network entity and a destination corresponding to the second network entity, the first fibre channel frame including a security enable parameter, wherein the first fibre channel frame is associated with a fabric login (FLOGI) or a port login (PLOGI) message, wherein the security enable parameter is used by the first network entity, when the first network entity is added to the fibre channel network, to determine if the second network entity has authentication capability or supports other security functions;

means for receiving an acknowledgment from the second network entity indicating that the second network entity has authentication capability or supports other security functions, the acknowledgement including key and algorithm information and a salt parameter;

means for inserting key and algorithm information from the second network entity into a security database;

means for identifying a second fibre channel frame having a source corresponding to the first network entity and a destination corresponding to the second network entity;

means for determining if the second fibre channel frame corresponds to the selectors of an entry in a security database;

means for encrypting a first portion of the second fibre channel frame using key and algorithm information associated with the entry in the security database;

means for providing a security control indicator in the second fibre channel frame, wherein the security control indicator is used to determine if the frame is encrypted or authenticated;

means for transmitting the second fibre channel frame to the second network entity.

* * * * *